United States Patent
Weir et al.

(10) Patent No.: US 6,922,625 B2
(45) Date of Patent: Jul. 26, 2005

(54) JET ENGINE CONTROL AND PROTECTION SYSTEM AND METHOD

(75) Inventors: Kenneth S. Weir, Tucson, AZ (US); Timothy D. Mahoney, Chandler, AZ (US); Joseph M. Horvath, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/317,476

(22) Filed: Dec. 12, 2002

(65) Prior Publication Data

US 2004/0117102 A1 Jun. 17, 2004

(51) Int. Cl.$^7$ .......................... G05B 23/00; G06F 11/16; G06F 15/16
(52) U.S. Cl. .......................... 701/100; 701/14; 244/194
(58) Field of Search .............................. 701/3, 7, 8, 14, 701/100; 244/75 R, 194, 76 R; 318/560, 562, 564, 565, 567, 568.23

(56) References Cited

U.S. PATENT DOCUMENTS

| | | | |
|---|---|---|---|
| 3,978,659 A | | 9/1976 | Smith et al. ............ 60/39.28 R |
| 4,130,241 A | * | 12/1978 | Meredith et al. ............ 235/307 |
| 4,497,059 A | * | 1/1985 | Smith ............................ 371/36 |
| 4,622,667 A | | 11/1986 | Yount ............................... 371/9 |
| 4,716,531 A | | 12/1987 | Saunders et al. |
| 5,274,554 A | * | 12/1993 | Takats et al. ........... 364/424.03 |
| 5,504,860 A | * | 4/1996 | George et al. .......... 395/182.09 |
| 5,550,736 A | | 8/1996 | Hay et al. ............... 364/424.03 |
| 5,572,620 A | | 11/1996 | Reilly et al. ............ 395/182.09 |
| 6,112,140 A | | 8/2000 | Hayes et al. ................... 701/14 |
| 6,353,790 B1 | | 3/2002 | Tsuzuki |
| 6,480,780 B1 | | 11/2002 | Schwamm |
| 6,578,794 B1 | * | 6/2003 | Clark et al. ................ 244/75 R |
| 2003/0056491 A1 | * | 3/2003 | Coleman et al. .......... 60/39.281 |

FOREIGN PATENT DOCUMENTS

| | | |
|---|---|---|
| EP | 0 653 690 A1 | 5/1995 |
| FR | 2 734 925 A1 | 12/1996 |

OTHER PUBLICATIONS

PCT International Search Report PCT/US03/39514, May 18, 2004.

* cited by examiner

Primary Examiner—Thomas G. Black
Assistant Examiner—Dalena Tran
(74) Attorney, Agent, or Firm—Douglas A. Mullen, Esq.

(57) ABSTRACT

A highly reliable, multi-channel control, monitoring, and protection system includes at least three processors in each of the redundant channels, a main processor, and first and second monitor processors. The main processor performs the main control functions, and the monitor processors mirror one or more of the functions performed by the main processor. The processing performed in the main processor and the monitor processors is continuously compared to determine whether control needs to be shifted to one of the other redundant channels.

29 Claims, 2 Drawing Sheets

JET ENGINE CONTROL AND PROTECTION SYSTEM AND METHOD

FIELD OF THE INVENTION

The present invention relates to a control and protection system for an aircraft jet engine and, more particularly, to a redundant control, monitoring, and protection system that provides both jet engine overspeed and overthrust protection.

BACKGROUND OF THE INVENTION

Typical gas turbine engine fuel supply systems include a fuel source, such as a fuel tank, and one or more pumps that take a suction on the tank and deliver pressurized fuel to the fuel manifolds in the engine combustor via a main supply line. The main supply line may include one or more valves in flow series between the pumps and the fuel manifolds. These valves generally include at least a main metering valve and a pressurizing-and-shutoff valve downstream of the main metering valve. In addition to the main supply line, many fuel supply systems may also include a bypass flow line connected upstream of the metering valve that bypasses a portion of the fuel flowing in the main supply line back to the inlet of the one or more pumps, via a bypass valve. The position of the bypass valve is controlled to maintain a substantially fixed differential pressure across the main metering valve.

Many aircraft use a redundant channel engine control system to control engine operation and the fuel supply system. In particular, each of the redundant channels in the engine control system receives various input signals from the engine and aircraft and a thrust setting from the pilot. In response to these input signals, the engine control system may modulate the position of a main metering valve to control the fuel flow rate to the engine fuel manifolds to attain and/or maintain a desired thrust.

Fuel supply and engine control systems, such as the one described above, may experience certain postulated failure modes that may result in certain postulated effects. For example, two particular types of postulated failure mode effects include engine overspeed and asymmetric engine overthrust, which may each occur as a result of the same failure mode. It is postulated that an engine overspeed can lead to a turbine rotor disk burst. It is postulated that a sustained asymmetric overthrust condition while the aircraft is on the ground can, in some systems, cause the aircraft to exit the runway. It is further postulated that a sustained asymmetric overthrust condition while the aircraft is in the air and on final approach to the runway can, in other systems, cause an in-flight shutdown of the engine.

Various postulated system or component failures may cause an engine overspeed and/or overthrust condition. For example, a postulated failure in the engine control system or in the fuel supply system may cause significantly higher fuel flow than commanded to one of the engines. This higher fuel flow can cause an asymmetric overthrust condition, which in some instances may lead to an engine overspeed condition. Additional postulated failures that may lead to an asymmetric overthrust condition include a failure in the engine control system that causes the main metering valve to become fully-opened or to stick in a fully-opened or intermediate position, or the main metering valve may itself fail in a fully-opened or intermediate position. Other postulated failures that may lead to an engine overspeed include breaking of an engine shaft, such as the low pressure spool shaft.

To accommodate the above-described postulated failure modes, each channel in the engine control system may include monitoring and protection systems that operate independent of the main engine controller within the channel. This independence is provided to preclude a single postulated failure mode from either causing, or preventing protection from, an engine overspeed or engine overthrust event. While the use of redundant monitoring and protection channels is safe and reliable, it also exhibits certain drawbacks. For example, an aircraft may not be dispatched if one of the redundant channels becomes inoperable while the aircraft is on the ground.

Hence, there is a need for an engine monitoring and protection system that can accommodate various postulated failure modes, including engine overspeed and engine overthrust modes, that does not prevent aircraft dispatch even if a single channel is inoperable. The present invention addresses one or more of these needs.

SUMMARY OF THE INVENTION

The present invention provides a highly reliable and redundant control, monitoring, and protection system that provides both jet engine overspeed and overthrust protection.

In one embodiment, and by way of example only, a jet engine control and protection system includes a main processor, a first monitor processor, and a second monitor processor. The main processor is coupled to receive at least one or more command signals and is operable, in response thereto, to determine an appropriate control signal for controlling a jet engine parameter. The first monitor processor is coupled to receive at least one or more command signals and is operable, in response thereto, to determine the appropriate control signal. Each command signal supplied to the first monitor processor is independent of each command signal supplied to the main processor. The second monitor processor is coupled to receive at least one or more command signals and is operable, in response thereto, to determine the appropriate control signal. Each command signal supplied to the second monitor processor is independent of each command signal supplied to the main and first monitor processors.

In another exemplary embodiment, a jet engine control and monitoring system includes a main processor, a first monitor processor, and a second monitor processor. The main processor is coupled to receive at least one or more command signals and at least one or more monitor signals related to jet engine operability and is operable, in response thereto, to determine whether or not a jet engine failure mode is present. The first monitor processor is coupled to receive at least one or more command signals and at least one or more monitor signals related to jet engine operability and is operable, in response thereto, to determine whether or not a jet engine failure mode is present. Each command signal and each monitor signal supplied to the first monitor processor is independent of each command signal and each monitor signal supplied to the main processor. The second monitor processor is coupled to receive at least one or more command signals and at least one or more monitor signals related to jet engine operability and is operable, in response thereto, to determine whether or not a jet engine failure mode is present. Each command signal and each monitor signal supplied to the second monitor processor is independent of each command signal and each monitor signal supplied to the main and first monitor processors.

In yet another exemplary embodiment, a method of controlling and protecting a jet engine includes making a first determination of an appropriate control signal for controlling a jet parameter based on one or more first command signals. One or more second command signals are used in making a second determination of the appropriate control signal. Each second command signal is independent of each first command signal. One or more third command signals are used in making a third determination of the appropriate control signal. Each third command signal is independent of each first and second command signal.

Other independent features and advantages of the preferred control and protection system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
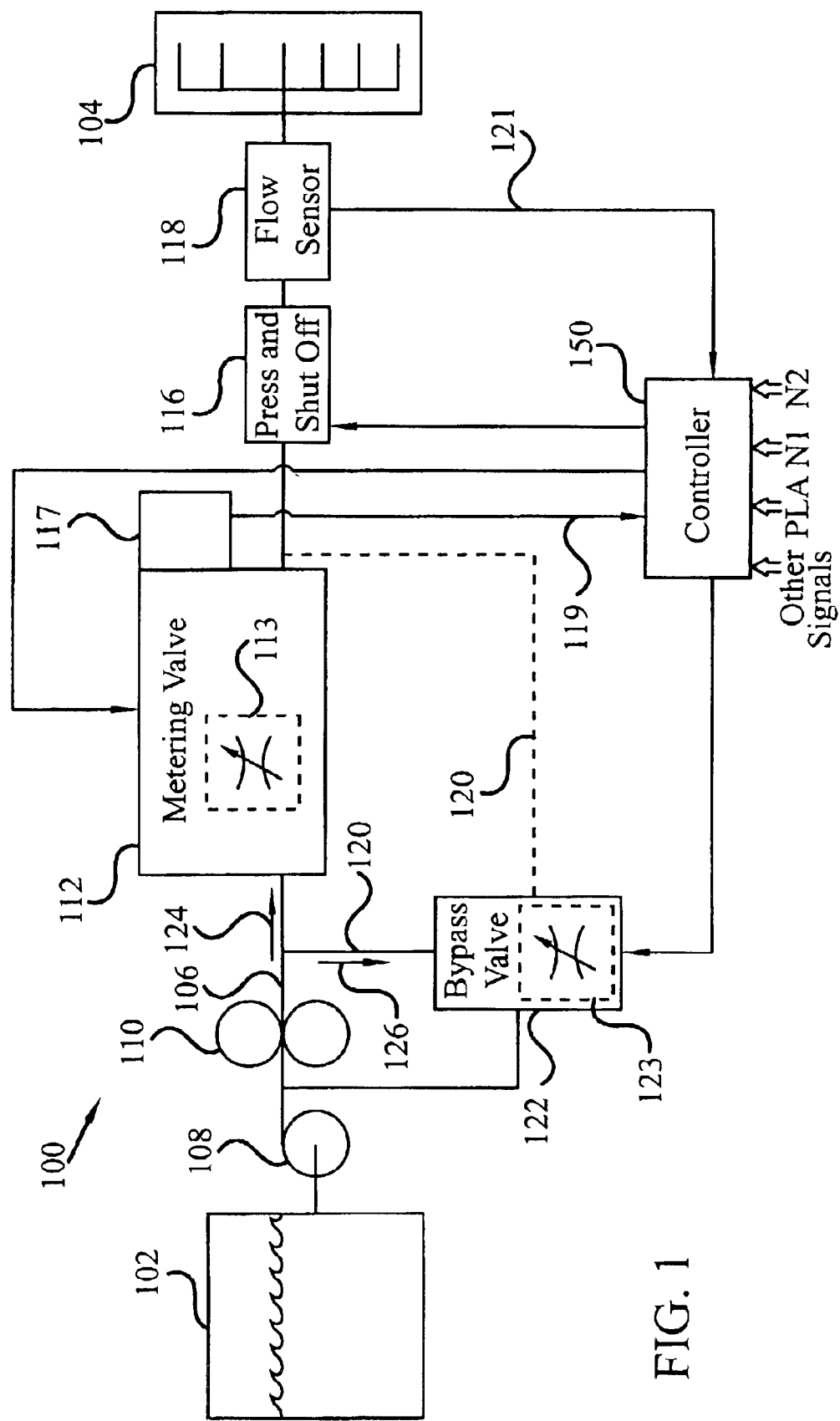
FIG. 1 is a simplified schematic diagram of a fuel delivery and control system.

A simplified schematic diagram of one embodiment of a fuel delivery and control system for a gas turbine engine, such as a turbofan jet aircraft engine, is depicted in FIG. 1. The system 100 includes a fuel source 102, such as a tank, that stores the fuel supplied to a jet engine combustor 104. A supply line 106 is coupled to the fuel source 102 and, via various components, delivers the fuel to the combustor 104. It is noted that the supply line 106 is, for convenience, depicted and described with a single reference numeral. However, it will be appreciated that the system is implemented using separate sections of piping, though a single section is certainly not prohibited. It will also be appreciated that the depicted fuel delivery system is merely exemplary of one end-use environment which may utilize the controller that is further described below.

One or more pumps are positioned in flow-series in the supply line 106 and take a suction on the fuel source 102. In the depicted embodiment, a booster pump 108, such as a relatively low horsepower centrifugal pump, and a high pressure pump 110, such as a positive displacement pump, are used. The booster pump 108 takes a suction directly on the fuel source 102 and provides sufficient suction head for the high pressure pump 10. The high pressure pump 10 then supplies the fuel, at a relatively high pressure, such as up to 1200 psig, to the remainder of the supply line 106.

A metering valve 112 is positioned in flow-series in the supply line 106 downstream of the high pressure pump 110. The metering valve 112 includes a first variable area flow orifice 113 through which a portion of the fuel in the supply line 106 flows. Fuel flow rate to the combustor 104 is, under normal circumstances, controlled by adjusting the position of the metering valve 112, and thus the area of the first variable area flow orifice 113, via the metering valve control device 114. It will be appreciated that the metering valve 112 may be any one of numerous valves including, but not limited to, a hydraulically-operated valve, a pneumatically-operated valve, or an electrically-operated valve.

A position sensor 117 is coupled to the metering valve 112, and is used to sense the metering valve's position and supply a valve position signal 119. It will be appreciated that the position sensor 117 may be any one of numerous position sensing devices including, but not limited to, a dual channel linear variable differential transformer (LVDT), a rotary variable differential transformer (RVDT), an optical sensor, or a float-type sensor.

Two additional major components are positioned in flow-series in the supply line 106 between the metering valve 112 and the combustor 104. These two major components are a pressurizing and shutoff valve 116, and a flow sensor 118. The pressurizing-and-shutoff valve 116 functions to ensure a minimum system pressure magnitude is in the supply line 106 downstream of the metering valve 112, and shuts when the pressure falls below this minimum pressure magnitude. The pressurizing and shutoff valve 116 may also receive a command signal from the controller 150. As will be described more fully below, this command signal may be used to shut off the supply of fuel to the combustors 104 in the event of a thrust control anomaly. The flow sensor 118 measures the fuel flow rate to the combustor 104 and generates a flow signal 121 representative of the measured flow rate.

A bypass flow line 120 is connected to the supply line 106 between the high pressure pump 110 and the metering valve 112. The bypass flow line 120 bypasses a portion of the fuel in the supply line 106 back to the inlet of the high pressure pump 110 or, alternatively, back to the inlet of the high pressure pump 110, the inlet of the booster pump 108, or back to the fuel source 102. It will be appreciated that the bypass flow line 120 could also be connected to the supply line at some point downstream of the metering valve 112, as illustrated in phantom in FIG. 1.

A bypass valve 122 is positioned in flow-series in the bypass flow line 120, and includes a second variable area flow orifice 123 through which fuel in the bypass flow line 120 flows. Thus, as indicated by the flow arrows in FIG. 1, a first fraction 124 of the fuel in the supply line 106 is directed through the metering valve 112, and a second fraction 126 is directed through the bypass valve 122. The absolute (and relative) magnitudes of the first fraction 124 and second fraction 126 are controlled by adjusting the areas of the first 113 and the second 123 variable area flow orifices. Similar to the metering valve 112, the bypass valve 122 in the depicted embodiment may be any one of numerous known designs including, but not limited to, a hyrdraulically-operated valve, a pneumatically-operated valve or an electrically-operated valve. It will be appreciated that if the bypass flow line 120 is positioned downstream of the metering valve 112, then the first fraction 124 of fuel is directed further downstream to the engine combustor 104, with the second fraction 126 directed through the bypass valve 122.

A multi-channel controller 150 controls the overall operation of the aircraft's engines, including the flow of fuel to the combustors 104 in each engine. With respect to fuel supply to the combustors 104, the controller 150 receives various independent and redundant command signals such as, for example, pilot lever angle (PLA), along with the metering valve position signal 119, and the flow signal 121, and controls the fuel flow rate to the combustor 104 accordingly. The controller 150 also receives various independent and redundant engine monitoring signals such as, for example, engine fan speed (N1) and high pressure compressor shaft speed (N2). The controller 150 uses these redundant monitoring signals, along with the redundant command signals, to determine, among other things, whether a thrust control anomaly (e.g., an engine overthrust condition), or an engine overspeed condition, or both, exist. The controller 150 additionally uses the received signals to determine the controllability of the metering valve 112.

Figure 2:
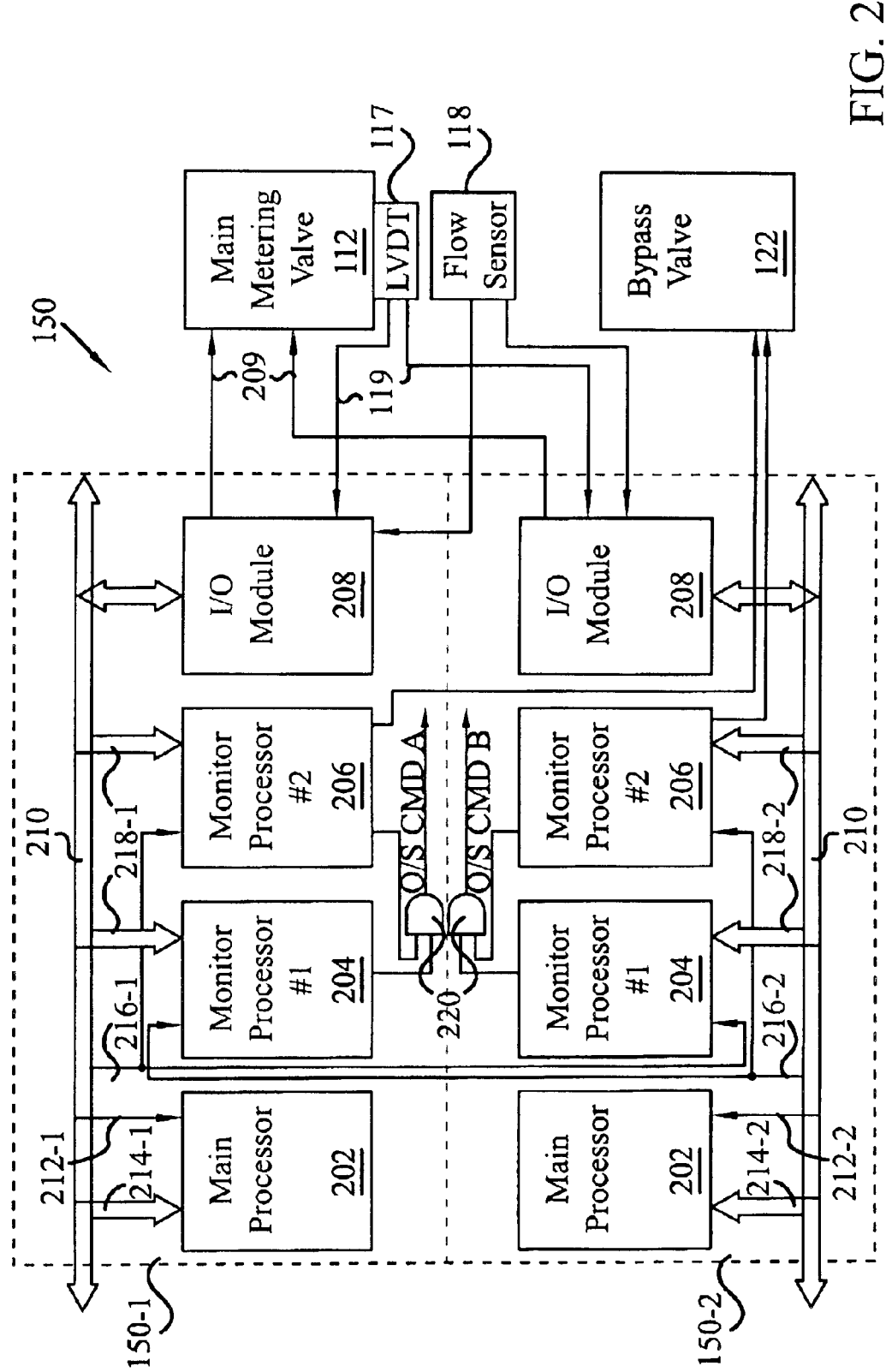
FIG. 2 is a functional block diagram of an exemplary dual channel engine controller that may be used with the system depicted in FIG. 1.

Turning now to FIG. 2, a more detailed discussion of the controller 150 and its functions will be provided. Initially, it is noted that the controller depicted in FIG. 2 is implemented in a dual-redundant channel configuration, with first and second channels 150-1, 150-2. However, it will be appreciated that the controller 150 could be implemented using other numbers of channels, from a single channel 150-1, up to N-number of redundant channels 150-1, 150-2, 150-3, . . . 150-N. When implemented using two or more redundant channels, the controller 150 operates with one set of redundant system functions selected from among the redundant channels being active, while the non-utilized redundant functions remain inactive. If, during system operation, it is determined that the presently active channel, or presently active function within a channel, is faulty or inoperative, then the presently active channel or function will be inactivated and one of the inactive redundant channels or functions will be activated.

With the above background in mind, it is seen that each controller channel 150-1, 150-2 includes four processing modules, a main processor 202, a first monitor processor 204, a second monitor processor 206, and an input/output (I/O) processor 208. In the depicted embodiment, the processing modules in each channel 150-1, 150-2 communicate with one another via a high integrity serial data bus 210. In a particular preferred embodiment, communication over the data bus 210 takes place using Time-Triggered Protocol (TTP®), which is marketed by Time Triggered Technology of Vienna, Austria. When TTP technology is used, the various redundant signals supplied to each of the processors in the controller channels 150-1, 150-2 need not be supplied via independently "hardwired" connections. This is due, at least in part, to the high integrity of TTP technology, which achieves a fault integrity of less than one event per 1,000,000,000 unit operating hours. Moreover, in a particular preferred embodiment, in which Time-Triggered Protocol communication is used, the processors in each channel 150-1, 150-2 are implemented using the MPC555 processor, or equivalent, which is manufactured by Motorola, Inc. This particular processor (or its equivalent) is selected for its operational flexibility and capability, and its implementation of onboard Time Processing Unit (TPU) technology. It will nonetheless be appreciated that other compatible communication protocols and other compatible processor types may be used, and that these are merely exemplary of a particular preferred embodiment. It will additionally be appreciated that the overall functionality of the MPC555 processor and its equivalents could be implemented using individual integrated circuit packages.

As was alluded to above, the main processor 202 in each channel is coupled to receive one or more independent command signals 212-1, 212-2 and one or more independent engine monitor signals 214-1, 214-2. As will be described more fully below, the main processors 202 also receive, via the communication bus 210, information related to metering valve position. The command signals 212-1, 212-2, which, as was noted above, may include a thrust command signal such as, for example, a pilot lever angle (PLA) signal from the cockpit, and the metering valve position information, are processed by the active channel main processor 202 according to a control law algorithm. The control law algorithm, which may be implemented in either hardware, or software, or both, determines the appropriate fuel flow rate to the engine combustors 104 that is needed to achieve the commanded thrust, and supplies a metering valve drive signal to the active channel I/O processor 208, via the active channel communication bus 210. The command signals 212-1, 212-2 supplied to each channel 150-1, 150-2 are independent from one another. It will be appreciated that other command signals 212-1, 212-2 may be used instead of, or in addition to, the PLA signal.

The engine monitor signals 214-1, 214-2, in conjunction with the engine command signals 212-1, 212-2, are also processed by the main processors 202 in each channel 150-1, 150-2 to determine whether or not a jet engine failure mode is present. For example, the engine monitor signals may include engine fan speed (N1) and high pressure compressor shaft speed (N2), which may be used to determine whether a jet engine overthrust and/or a jet engine overspeed condition exist. In the depicted embodiment, however, the main processor 202 does not implement any protective functions. Rather, as will be discussed more fully below, the active channel first and second monitor processors 204, 206 implement these functionalities. This configuration provides the main processor with a sufficient degree of independence from the first and second monitor processors 204, 206, so that certain single failure design criterion (e.g., no single fault shall cause a thrust control anomaly nor inhibit a protective action that prevents such an anomaly) may be met. However, it will be appreciated that the main processor 202 could implement protective functions, if so desired for a particular application. As with the command signals 212-1, 212-2, the engine monitor signals 214-1, 214-2 supplied to the main processors 202 in each channel 150-1, 150-2 are independent from one another. It will be appreciated that other types of engine monitoring signals may be used to determine whether the same, or different, types of engine failure modes are present.

In addition to the control and monitoring functions, the active channel main processor 202 may also implement enhanced fault detection features. For example, the main processor 202 may be configured to perform high level software validity checks, random-access-memory (RAM) fault checks, data comparison, and to implement a Watch-Dog Timer. If any of these additional checks indicates a fault (or potential fault), the active channel 150-1 (150-2), or main processor 202 in the active channel 150-1 (150-2), may be inactivated, and the inactive channel 150-2 (150-1), or main processor 202 in the inactive channel 150-2 (150-1), may be activated.

The active channel I/O processor 208 communicates with the active channel main processor 202 via the communication bus 210. Each I/O processor 208 is also independently coupled to provide a control signal to the main metering valve 112, and to receive the metering valve position signal 119 from the valve position sensor 117 and the flow signal 121 from the flow sensor 118. In the depicted embodiment, the active channel I/O processor 208 supplies a main metering valve drive signal 209 to the main metering valve 112, using a valve driver and control function that may be implemented in software, hardware, or both. In particular, the active channel I/O processor 208 supplies metering valve position information to the active channel main processor 202, via the active channel communication bus 210. Based on this information, and the independent command signal 212-1, 212-2 it receives, the active channel main processor 202 supplies a valve position command signal, via the communication bus 210, to the active channel I/O processor 208. The active channel I/O processor 208 then supplies the appropriate drive signal 209 to the main metering valve 212.

The first and second monitor processors 204, 206 in each channel are each coupled to receive one or more independent command signals 216-1, 216-2 and one or more independent engine monitor signals 218-1, 218-2. The command 216-1, 216-2 and engine monitor 218-1, 218-2 signals supplied to the first and second monitor processors 204, 206 are redundant to, but independent of, the command 212-1, 212-2 and engine monitor 214-1, 214-2 signals supplied to the main processor 202. Thus, no postulated common mode failures in the input signal paths will neither cause a failure to occur nor prevent a protective and/or corrective action.

The first and second monitor processors 204, 206 in the active channel 150-1, 150-2, each process the independent engine monitor signals 218-1, 218-2 and the independent command signals 216-1, 216-2 to determine whether or not a jet engine failure mode is present. In particular, the active channel first and second monitor processors 204, 206 each receive independent signals related to engine speed such as, for example, engine fan speed (N1) and high pressure compressor shaft speed (N2). If the magnitude of either, or both, of these signals, exceeds a predetermined value, the active channel first and second monitor processors 204, 206 will issue an overspeed shutdown command. It will be appreciated that engine fan speed and high pressure compressor shaft speed are merely exemplary of the number and type of engine parameters that may be used to detect an overspeed condition, and that other numbers and/or types of engine parameters may be used.

Each channel 150-1, 150-2 also includes logical AND circuitry, represented in FIG. 2 as AND gates 220. Each AND gate 220 has an individual input terminal coupled to receive an overspeed shutdown command issued by one of the first and second monitor processors 204, 206. Thus, an overspeed shutdown will occur only if both of the active channel monitor processors 204, 206 issue an overspeed shutdown command. The AND gates 220 in each channel 150-1, 150-2 may be coupled to, for example, a solenoid controlled fuel shut-off valve that, when energized, shuts off fuel flow to the combustors 104. The first and second monitor processors 204, 206 may also be configured to implement additional "permission logic," which will only allow an overspeed shutdown to occur during certain phases of flight. This additional functionality may be implemented using software, discrete hardware, or a combination of both.

The active channel first and second monitor processors 204, 206 also process the independent command signals 216-1, 216-2 to determine whether a jet engine overthrust condition exists. In general, the first and second monitor processors 204, 206 preferably make this determination according to one of two methods. With the first method, the monitor processors 204, 206 perform a simple comparison of commanded engine thrust to actual engine thrust, based on the command signals 216-1, 216-2 and monitor signals 218-1, 218-2, respectively supplied to each monitor processor 204, 206. If the difference between the commanded and actual engine thrust exceeds a predetermined threshold, this is indicative of a thrust control anomaly. If the active channel first and second monitor processors 204, 206 both agree that a thrust control anomaly exists, then control is shifted from the active channel 150-1 (150-2), or from the main processor 202 in the active channel 150-1 (150-2), to the inactive channel 150-2 (150-1), or to the main processor 202 in the inactive channel 150-2 (150-1). It is also noted that, with the first method, the active main processor 202 will preferably implement the previously described enhanced fault detection features, to provide an overall level of fault detection that may be needed to meet certain design and/or performance specifications.

Shifting control from one main processor 202 to another accommodates the situation in which the detected anomaly is due to erroneous computations in the initially active main processor 202. However, it will be appreciated that if the main processors 202 include the capability to implement independent fault detection functionality, which at least substantially achieves complete coverage of faults on the main processor node, then the main processors 202 will each be able to detect its own faults locally and, if a fault is detected, shift control directly to the inactive channel main processor 202. More specifically, if the active main processor 202 detects its own fault, then it may assume a "fail silent" mode. In the fail silent mode, the main processor 202 is reset and is fully inactivated until it may again resume fault free operation. While the previously active main processor 202 is in the fail silent mode, the other main processor 202 is activated. Once the active main processor 202 reset, and is able to resume fault free operation, it may once again be activated. However, the previously inactive processor 202 remains in control.

With the second method, the first and second monitor processors 204, 206 are each configured to process the independent command signals 216-1, 216-2 according to the same control law implemented in the main processor 202. Thus, under normal operating circumstances, the active channel main processor 202, and the active channel first and second monitor processors 204, 206 should all compute the same result. In the depicted embodiment, this means that all three active channel processors 202, 204, 206 will compute the same metering valve drive signal value. In a particular preferred implementation of the second method, the active channel main 202, first monitor 204, and second monitor 206 processors each repetitively perform a control law computation in a predetermined time frame. The result of each processor's computation within each time frame are compared to one another to determine whether a thrust control anomaly exists. If this comparison indicates that one of the active processors 202, 204, 206 may be faulty, then the processor that is deemed faulty is inactivated. Operation may then continue with the two remaining active processors, or one of the inactive redundant processors 202, 204, 206 may be activated to take the place of the processor that was just inactivated.

It is noted that the above-described inactivation/activation funtionality may be implemented using the protocol of the TTP bus, which provides for the capability to vote an erroneous processor out of membership and, if desired, to activate an inactive redundant processor. This allows the system to continue its operation in a seamless manner. It will be appreciated that the second method of determining whether a thrust control anomaly exists is preferred over the first method because it allows detection of a wider class of failures, and thus greater fault coverage. Because of this, the main processors 202 in each channel 150-1, 150-2, may not implement the enhanced fault detection features described above. However, it will be appreciated that the main processors 202 could implement these features if so desired.

No matter which of the above-described methods is implemented, the first method or the second method, if both of the active first and second monitor processors 204, 206 agree that a jet engine thrust control anomaly exists after the initial corrective action of switching or resetting the main processor 202, then additional corrective action is taken. If the thrust control anomaly persists after the initial corrective action, this indicates that the thrust control anomaly may have been caused by a mechanical failure of the metering valve 112. Thus, following the following the initial corrective action, one of the active monitor processors, which is the active second monitor processor 206 in the depicted embodiment, will attempt to control fuel flow to the engine combustors 104 by controlling, for example, the position of the bypass valve 122. It will be appreciated that some engine fuel supply systems may not be configured similar to the exemplary system shown in FIG. 1, and thus may not include the bypass valve 122. The system may instead include differently configured back-up valve that may be used to control fuel flow under this postulated scenario. In addition, if both of the active first and second monitor processors 204, 206 detect an overspeed condition, then an overspeed shutdown command, as described above, will be issued.

The controller 150 was described as being implemented in a muti-channel, dual monitor processor configuration. Moreover, the channels were described as being implemented in one of two configurations. In both of the described configurations, the first 204 and second 206 monitor processors in each channel 150-1, 150-2 each receive command and monitor signals that are equivalent to, and independent of, the command and monitor signals supplied to the main processor 202 in each channel 150-1, 150-2. However, in the first configuration, the first 204 and second 206 monitor processors determine whether a thrust control anomaly exists by comparing commanded thrust and actual thrust. As was noted above, with this first configuration, the main processor 202 preferably implements enhanced fault detection features. In the second configuration, the first 204 and second 206 monitor processors process the received command and monitor signals according to the same control law that is implemented in the main processor 202. With this second configuration, the main processors 202 may not implement the enhanced fault detection features. However, as was also alluded to above, the controller 150 could be implemented in a single channel configuration, with the single channel including a main processor 202, and first 204 and second 206 monitor processors. It will be appreciated that in the single channel configuration, the first 204 and second 206 monitor processors may also be implemented in one of the two configurations described. The skilled artisan will also appreciate that the controller 150 could be implemented in a fully distributed architecture with one or more channels 150-1, 150-2, 150-3, . . . 150-N, each having one or more main processors 202, and/or one or more monitor processors 204, 206.

The engine control and protection system exhibits increased reliability over presently used systems, and provides for reliable detection and correction of certain postulated failure modes, including jet engine overspeed and jet engine overthrust anomalies. The architecture of the system, in which independent and redundant processors receive independent and redundant command and monitor signals, significantly reduces the likelihood of a single-point failure, and allows the aircraft to be dispatched even if only a single redundant channel is operational.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:
1. A jet engine control and protection system, comprising:
a main processor coupled to receive at least one or more command signals and operable, in response thereto, to determine an appropriate control signal for controlling a jet engine parameter;
a first monitor processor coupled to receive at least one or more command signals and operable, in response thereto, to determine the appropriate control signal, each command signal supplied to the first monitor processor being independent of each command signal supplied to the main processor; and
a second monitor processor coupled to receive at least one or more command signals and operable, in response thereto, to determine the appropriate control signal, each command signal supplied to the second monitor processor being independent of each command signal supplied to the main and first monitor processors.
2. The system of claim 1, wherein:
the system includes N-number of redundant channels, each redundant channel including a main processor, a first monitor processor, and a second monitor processor; and
at least one of the main, first monitor, and second monitor processors in one of the redundant channels is active and implementing one or more functions, while the main, first monitor, and second monitor processors in the other redundant channels are inactive.
3. The system of claim 2, wherein one or more functions in at least one of the active redundant processors is inactivated and the same one or more functions in one of the inactive redundant processors is activated when at least the active first and second monitor processors disagree with the active main processor as to the appropriate control signal.
4. The system of claim 2, wherein at least a portion of each of the active redundant channels is inactivated and at least a portion of one of the inactive redundant channels is activated when at least the active first and second monitor processors disagree with the active channel main processor as to the appropriate control signal.
5. The system of claim 4, wherein, one of the active first and second monitor processors supplies the appropriate control signal if, a predetermined time period after the activation of at least a portion of one of the inactive redundant channels, the disagreement between the active processors persists.
6. The system of claim 1, further comprising:
an input/output (I/O) module coupled to receive at least the control signal from the main processor and operable to supply a conditioned control signal.
7. The system of claim 6, wherein the first and second monitor processors are further operable to issue an overspeed shutdown command.
8. The system of claim 7, further comprising:
logical AND circuitry having an input coupled to each of the first and second monitor processors and operable to supply a shutdown command signal when the first and second monitor processors issue an overspeed shutdown command.
9. The system of claim 1, further comprising:
a main fuel control valve coupled to receive the conditioned control signal from the I/O module.
10. The system of claim 1, wherein the main, first monitor, and second monitor processors are each further coupled to receive one or more monitor signals related to jet engine operability.

11. The system of claim 1, wherein the main processor is further operable to conduct self-check fault detection.

12. A jet engine control and monitoring system, comprising:
- a main processor coupled to receive at least one or more command signals and at least one or more monitor signals related to jet engine operability and operable, in response thereto, to determine whether or not a jet engine failure mode is present;
- a first monitor processor coupled to receive at least one or more command signals and at least one or more monitor signals related to jet engine operability and operable, in response thereto, to determine whether or not a jet engine failure mode is present, each command signal and each monitor signal supplied to the first monitor processor being independent of each command signal and each monitor signal supplied to the main processor; and
- a second monitor processor coupled to receive at least one or more command signals and at least one or more monitor signals related to jet engine operability and operable, in response thereto, to determine whether or not a jet engine failure mode is present, each command signal and each monitor signal supplied to the second monitor processor being independent of each command signal and each monitor signal supplied to the main and first monitor processors.

13. The system of claim 12, wherein:
- the system includes N-number of redundant channels, each redundant channel including a main processor, a first monitor processor, and a second monitor processor; and
- at least one of the redundant channels is active and implementing one or more functions, while the other redundant channels are inactive.

14. The system of claim 12, wherein one or more functions in at least one of the active processors is inactivated and the same one or more functions in one of the inactive redundant processors is activated when at least the active first and second monitor processors disagree with the active main processor as to whether or not a jet engine failure mode is present.

15. The system of claim 12, wherein at least a portion of the active redundant channel is inactivated and at least a portion of one of the inactive redundant channels is activated when at least the active channel first and second monitor processors disagree with the active channel main processor as to whether or not a jet engine failure mode is present.

16. The system of claim 12, where the main processor is further operable to conduct self-check fault detection.

17. The system of claim 12, wherein the monitor signals received by the main, first monitor, and second monitor processors include at least one of jet engine fan speed and shaft speed.

18. The system of claim 12, wherein the jet engine failure mode includes at least one of jet engine overthrust and jet engine oversped.

19. A jet engine control and protection system, comprising:
- N-number of redundant control and protection channels, one of which is active while the others are inactive, each channel including,
  - a main processor coupled to receive one or more command signals and one or more engine monitor signals related to jet engine operability, and operable, in response thereto, to determine (i) an appropriate control signal for controlling a jet engine parameter and (ii) whether or not a jet engine failure mode is present,
  - a first monitor processor coupled to receive one or more command signals and one or more engine monitor signals related to et engine operability, and operable, in response thereto, to determine (i) an appropriate control signal for controlling a jet engine parameter and (ii) whether or not a jet engine failure mode is present, each command signal and each engine monitor signal supplied to the first monitor processor being independent of each command signal and each engine monitor signal supplied to the main processor, and
  - a second monitor processor coupled to receive one or more command signals and one or more engine monitor signals related to jet engine operability, and operable, in response thereto, to determine (i) an appropriate control signal for controlling a jet engine parameter and (ii) whether or not a jet engine failure mode is present, each command signal and each engine monitor signal supplied to the second monitor processor being independent of each command signal and each engine monitor signal supplied to the main and first monitor processors,
- wherein at least a portion of the active redundant channel is inactivated and at least a portion of one of the inactive redundant channels is activated when at least the active channel first and second monitor processors disagree with the active channel main processor as to one of:
  - (i) the appropriate control signal, and
  - (ii) whether a jet engine failure mode is present.

20. A method of controlling and protecting a jet engine, comprising:
- making a first determination of an appropriate control signal for controlling a jet parameter based on one or more first command signals;
- making a second determination of the appropriate control signal based on one or more second command signals, each second command signal being independent of each first command signal; and
- making a third determination of the appropriate control signal based on one or more third command signals, each third command signal being independent of each first and second command signal.

21. The method of claim 20, further comprising:
- making the first, second, and third determinations of whether or not a jet engine failure mode is present using N-number of redundant channels; and
- maintaining one of the redundant channels active, while the other redundant channels are inactive.

22. The method of claim 21, further comprising:
- making a fourth determination as to whether the second and third determinations of the appropriate control signal disagree with the first determination of the appropriate control signal; and
- if so, inactivating at least a portion of the active redundant channel and activating at least a portion one of the inactive redundant channels.

23. The method of claim 20, further comprising:
- making a first determination as to whether or not a jet engine failure mode is present based on one or more first signals related to jet engine operability;
- making a second determination as to whether or not a jet engine failure mode is present based on one or more second signals related to jet engine operability, each second signal being independent of each first signal; and making a third determination as to whether or not a jet engine failure mode is present based on one or more third signals related to jet engine operability, each third signal being independent of each first and second signal.

24. The method of claim 23, further comprising:

making the first, second, and third determinations of whether or not a jet engine failure mode is present using N-number of redundant channels; and maintaining one of the redundant channels active, while the other redundant channels are inactive.

25. The system of claim 24, further comprising:

making a fourth determination as to whether the second and third determinations as to whether or not a jet engine failure mode is present disagree with the first determination as to whether or not a jet engine failure mode is present; and if so, inactivating at least a portion of the active redundant channel and activating at least a portion of one of the inactive redundant channels.

26. The method of claim 23, wherein the jet engine failure mode includes at least one of jet engine overthrust and jet engine overspeed.

27. The method of claim 26, further comprising:

issuing one or more overspeed shutdown commands if it is determined that the jet engine overspeed failure mode is present.

28. The method of claim 27, further comprising:

shutting down the jet engine when at least two overspeed shutdown commands are issued.

29. In a jet engine protection and control system having N-number of redundant channels, one of which is active and the others of which are inactive, a method of controlling and protecting the jet engine, comprising:

making a first determination in the active channel of an appropriate control signal for controlling a jet parameter based on one or more first command signals;

making a second determination in the active channel of the appropriate control signal based on one or more second command signals, each second command signal being independent of each first command signal;

making a third determination in the active channel of the appropriate control signal based on one or more third command signals, each third command signal being independent of each first and second command signal;

making a fourth determination in the active channel as to whether the second and third determinations disagree with the first determination of the appropriate control signal;

making a fifth determination in the active channel as to whether or not a jet engine failure mode is present based on one or more first signals related to jet engine operability;

making a sixth determination in the active channel as to whether or not a jet engine failure mode is present based on one or more second signals related to jet engine operability, each second signal being independent of each first signal;

making a seventh determination in the active channel as to whether or not a jet engine failure mode is present based on one or more third signals related to jet engine operability, each third signal being independent of each first and second signal;

making an eighth determination in the active channel as to whether the sixth and seventh determinations disagree with the fifth determination as to whether or not a jet engine failure mode is present; and inactivating at least a portion of the active redundant channel and activating at least a portion of one of the inactive redundant channels if one of the fourth and eighth determinations indicates one of a disagreement between the second and third determinations and the first determination, and a disagreement between the sixth and seventh determinations and the fifth determination, respectively.

* * * * *

UNITED STATES PATENT AND TRADEMARK OFFICE
CERTIFICATE OF CORRECTION

PATENT NO. : 6,922,625 B2
DATED : July 26, 2005
INVENTOR(S) : Kenneth S. Weir et al.

It is certified that error appears in the above-identified patent and that said Letters Patent is hereby corrected as shown below:

Column 12,
Line 6, replace "et" with -- jet --.

Signed and Sealed this

Third Day of January, 2006

JON W. DUDAS
*Director of the United States Patent and Trademark Office*